United States Patent [19]

Sulprizio

[11] Patent Number: 5,353,682

[45] Date of Patent: Oct. 11, 1994

[54] CLOSING AND OPENING MEANS FOR CASTING MACHINE

[76] Inventor: Lucelio Sulprizio, 3059 Frandoras Cir., Oakley, Calif. 94561

[21] Appl. No.: 80,067

[22] Filed: Jun. 18, 1993

Related U.S. Application Data

[62] Division of Ser. No. 817,772, Jan. 8, 1992, Pat. No. 5,246,059.

[51] Int. Cl.$^5$ .................................................. F15B 15/22
[52] U.S. Cl. .......................................... 91/395; 91/394; 92/110; 92/161
[58] Field of Search ............... 92/5 R, 13.6, 110, 146, 92/161, 128; 91/394, 395

[56] References Cited

U.S. PATENT DOCUMENTS

| | | |
|---|---|---|
| 2,112,342 | 3/1938 | Lester . |
| 2,143,082 | 1/1939 | Morris . |
| 2,620,528 | 12/1952 | de Sternberg . |
| 2,636,233 | 4/1953 | Perkon . |
| 2,988,778 | 6/1961 | Chaze et al. . |
| 3,199,159 | 8/1965 | Wernecke . |
| 3,263,277 | 8/1966 | Ohlendorf et al. . |
| 3,272,132 | 9/1966 | Stoelting et al. ................... 92/161 |
| 3,345,691 | 10/1967 | Aoki . |
| 3,414,693 | 12/1968 | Watson et al. ................... 92/5 R |
| 3,433,292 | 3/1969 | McDonald . |
| 3,497,919 | 3/1970 | Brochetti . |
| 3,888,453 | 6/1975 | Jeffreys . |
| 3,890,081 | 6/1975 | Grundmann . |
| 3,971,432 | 7/1976 | Hardey . |
| 4,158,327 | 6/1979 | Aoki . |
| 4,206,799 | 6/1980 | McDonald . |
| 4,243,369 | 1/1981 | James . |
| 4,284,124 | 8/1981 | Komatsu et al. . |
| 4,506,871 | 3/1985 | Yonezawa . |
| 4,545,756 | 10/1985 | Hiroshi et al. . |
| 4,815,518 | 3/1989 | Sulprizio . |
| 4,826,146 | 5/1989 | Shirakawa . |
| 4,827,835 | 5/1989 | La Bair ................... 92/161 |
| 4,865,537 | 9/1989 | Shima . |

FOREIGN PATENT DOCUMENTS

| | | | |
|---|---|---|---|
| 0750129 | 5/1933 | France | ................... 92/161 |
| 59-185560 | 10/1984 | Japan . | |
| 60-82261 | 10/1985 | Japan . | |
| 1068220 | 4/1982 | U.S.S.R. . | |
| 1260111 | 4/1985 | U.S.S.R. . | |
| 1418515 | 8/1988 | U.S.S.R. | ................... 91/395 |

OTHER PUBLICATIONS

Aeroquip Corporation, "T–J Cylinders" Bulletin 4040A, 1985, pp. 1, 3, 13, 15, 17, 19, 20.

Primary Examiner—Thomas E. Denion
Attorney, Agent, or Firm—Haverstock, Medlen & Carroll

[57] ABSTRACT

A slidably attachable, automated means for opening and closing the die halves of a casting machine. Cylinders are provided having integral vertical side grooves for mounting on said casting machines and the like. The preferred hydraulic cylinder has a hollow piston rod connected to the piston and projecting from one end of the cylinder. A fluid flow line movable within the cylinder projects from the other end of the cylinder and slidably passes through the piston into the piston rod. Separate elements contact the piston at opposite ends of its stroke to move the fluid flow line and switch the fluid flow in the cylinder.

4 Claims, 4 Drawing Sheets

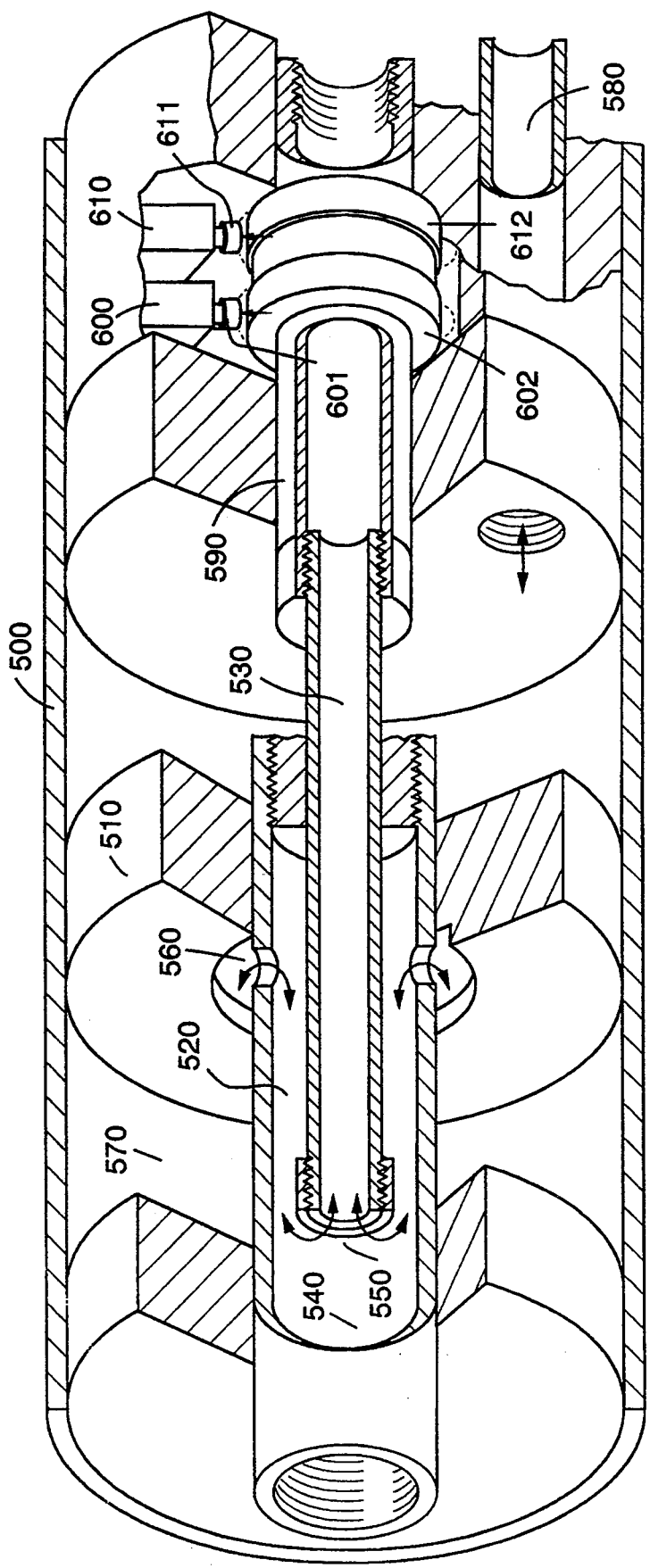
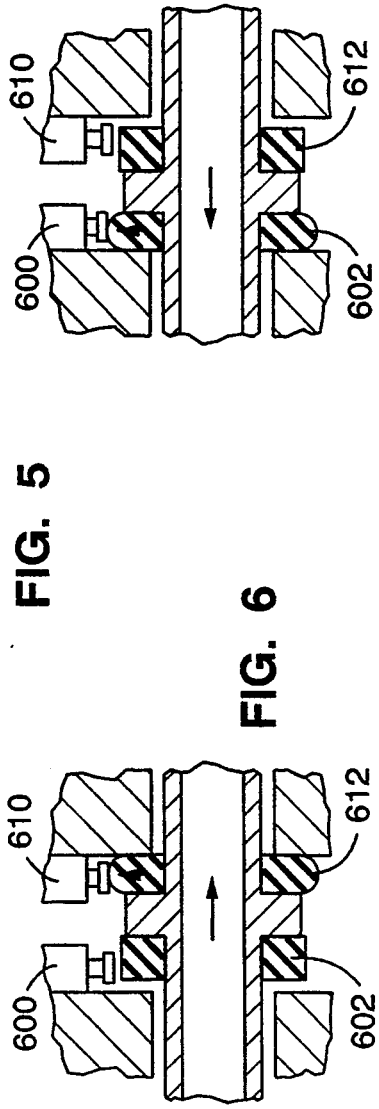
FIG. 5
FIG. 6
FIG. 7

CLOSING AND OPENING MEANS FOR CASTING MACHINE

This is a divisional of application Ser. No. 07/817,772, filed Jan. 8, 1992, now U.S. Pat. No. 5,246,059.

FIELD OF THE INVENTION

This invention relates to die casting machines of the type having two separable die halves into which molten casting material is poured and out of which finished workpieces are removed. More particularly this invention relates to a slidably attachable, automated means for opening and closing the die halves.

BACKGROUND

Die casting machines generally employ two cooperating die halves. When the dies are in a closed position, molten casting material is poured into the machine to fill the interior cavity between the die halves. Of course, the die halves are rigidly locked together during this step of the casting process.

Once casting is complete and the casting material has hardened, the workpiece needs to be removed. This requires separating the die halves, as well as separating the workpiece from the die halves.

A number of means for moving the die halves with respect to one another and for locking them in a closed position are described. A mechanical closing and opening means is described, for example, in U.S. Pat. No. 4,815,518. With this approach, two exterior casting plates, each capable of housing one of the die halves, are mounted on a slidable frame that is manually positioned using a rack and pinion assembly. A second, manually operated rack and pinion assembly is used to position a core or plug on each side of the casting plates to make contact with each of the die halves. When the casting material has hardened and the workpiece is to be removed, one or both of the plugs on each side of the die are moved slightly with respect to the die to release one of the plugs from the die. Thereafter the die halves can be moved by actuating the slidable frames holding the die halve. This exposes one half (in some cases, all) of the workpiece.

This mechanical approach to die closing and opening for die casting machines is an advantage because the die moving and workpiece separating actions are accomplished by separate mechanisms. Nonetheless, the manually operated system is useful for casting only limited quantities of articles and requires skilled operators.

SUMMARY OF THE INVENTION

The present invention relates to die casting machines of the type having two separable die halves into which molten casting material is poured and out of which finished workpieces are removed. More particularly this invention relates to a slidably attachable, automated means for opening and closing the die halves. In one embodiment, the slidably attachable automated opening and closing means comprises a plurality of cylinders, each having slide plates for mounting to said casting machine. In one embodiment, the cylinders are pneumatic cylinders. In the preferred embodiment, the cylinders are hydraulic cylinders. The preferred hydraulic cylinder has internal fluid lines, adjustable stroke, and piston cushioning features.

DESCRIPTION OF THE DRAWINGS

FIG. 5 is a foreshortened sectional view of another preferred embodiment of a cylinder.

FIGS. 6 and 7 are sectional views showing corresponding movement of a preferred embodiment of a limit switch actuator shown in FIG. 5.

DESCRIPTION OF THE INVENTION

The present invention comprises a slidably attachable means for opening and closing the die halves of a casting machine. In one embodiment, a plurality of hydraulic cylinders with pistons perform the function of moving the die halves toward and away from each other.

Figure 1:
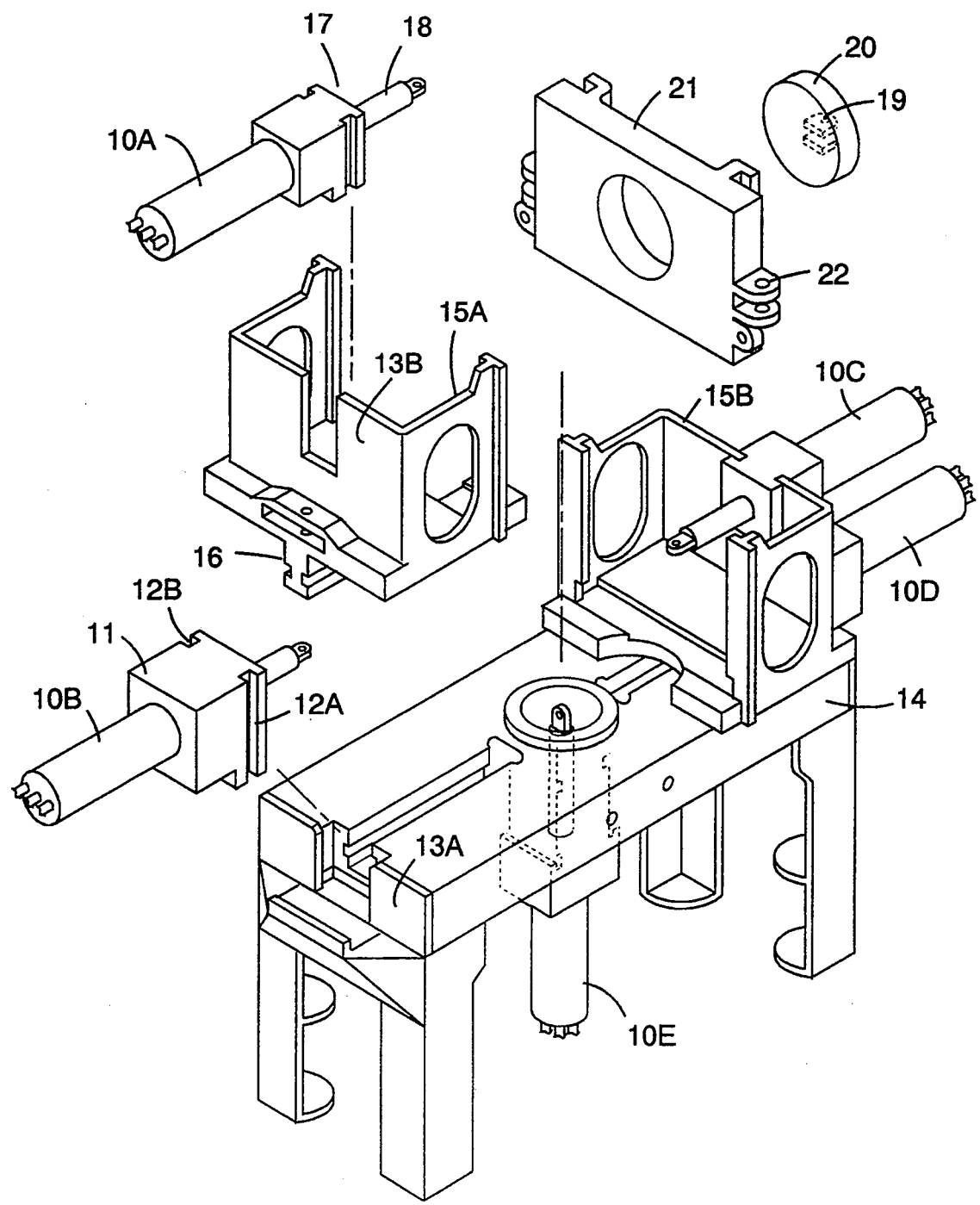
FIG. 1 is a perspective view of a die casting machine showing slidably attachable means for opening and closing the die halves used for casting.

Typically, the opening and closing means of the present invention is supported on the base of the casting machine. FIG. 1 shows one embodiment of a preferred casting machine for the slidable attachment of the preferred opening and closing means of the present invention. A more detailed description of this machine is found in U.S. Pat. No. 4,815,518, hereby incorporated by reference.

In FIG. 1, cylinders are mounted on the casting bench via integral mounting blocks. In this manner, the manually operated means can be quickly replaced with an automated hydraulic cylinder system, without cumbersome unbolting and bolting of the two systems.

The slide plates of the casting bench have their outer edges firmly attached to the integral mounting block of the cylinders. Consequently, the body of the cylinder remains stationary while the rod end moves (see arrows in FIG. 2) as fluid is admitted to the various chambers.

Although fluid may be admitted to the piston chamber in the normal manner with lines directly connecting to either end of the cylinder, it is preferred that fluid connections be made internally. In one embodiment, fluid conduits are provided that are parallel to the rods, along with requisite inlet and outlet ports. In the preferred cylinders, the fluid conduit is internal to the rod (see FIG. 3).

Because dies employed in casting machines vary greatly as to thickness and amount of projection of one into the other, the present invention contemplates an opening and closing means adapted for various dies. In the hydraulic cylinder embodiment, the preferred cylinder has a readily operable means for increasing or reducing the piston stroke as permitted by the dies actually used.

Because imprecise movement of the die halves can cause damage to the workpiece, the present invention further contemplates a preferred opening and closing means characterized by precise movements that avoid strains on the casting machine and possible damage to the workpiece and/or dies. In one hydraulic cylinder embodiment, the present invention contemplates cushioning the die operating piston so that it properly terminates its movement.

DESCRIPTION OF THE PREFERRED EMBODIMENTS

Figure 2:
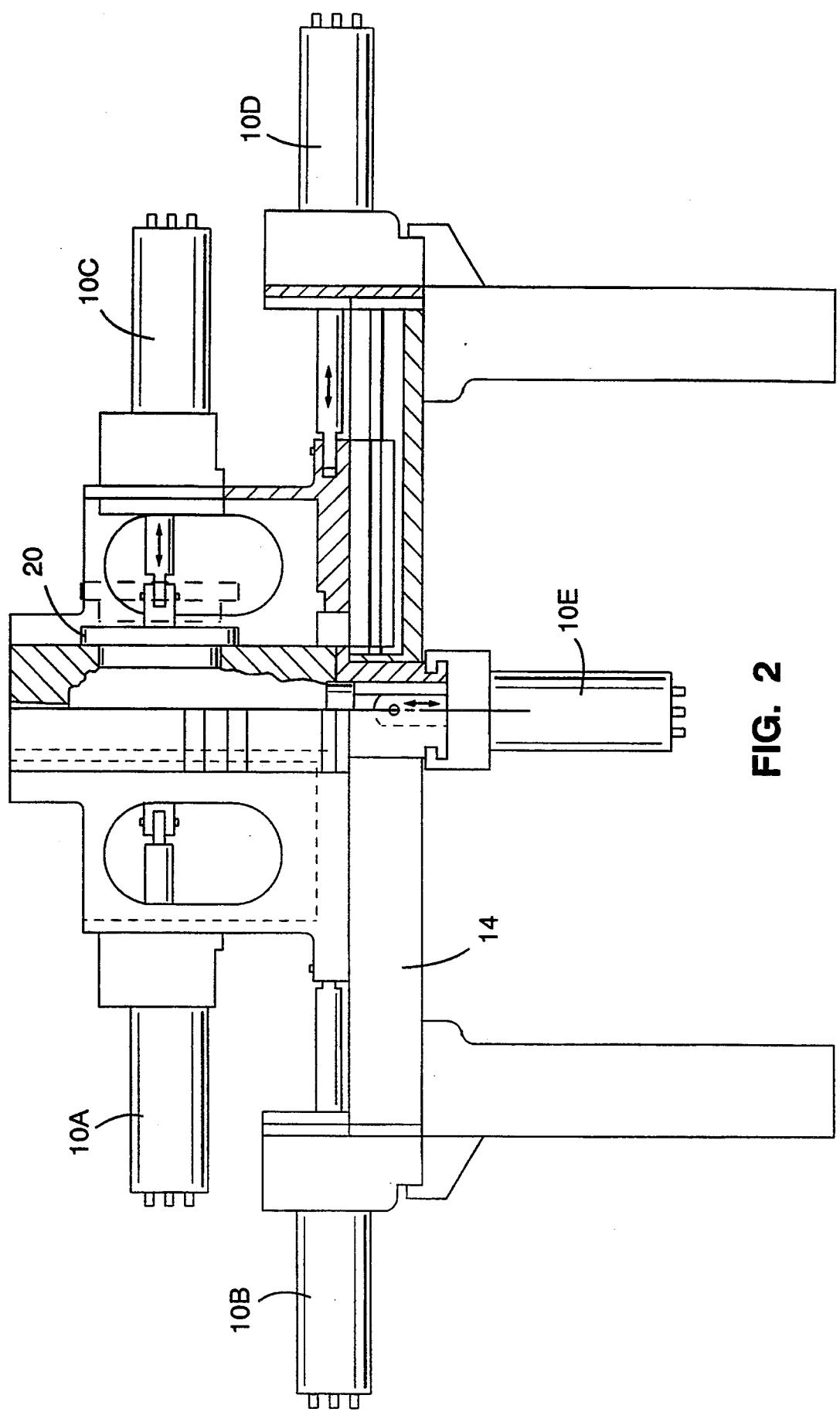
FIG. 2 is a side elevational view partially in section of the present invention.

As shown in FIGS. 1 and 2, the preferred opening and closing means of the present invention comprises hydraulic cylinders (10A, 10B, 10C, 10D, 10E), each having an integral mounting block (11) with vertical side grooves (12A, 12B) for receiving slide plates (13). The slide plates (13) are configured as end slide plates (13A) of the casting bench (14) as well as back wall slide plates (13B) of each of two frames (15A, 15B). Both frames (15A, 15B) have a slide track (16) for mounting on the casting bench (14).

Each cylinder has a moving rod (17) having projecting ends (18) adapted to connect with a pin assembly (19) of a plug (20) to control movement of the plug (20) in relation to a die block (21). One die block (21) is slidably mounted on each frame (15B). Each die block (21) has horizontal projections (22) adapted for connecting with another die block (not shown).

Figure 3:
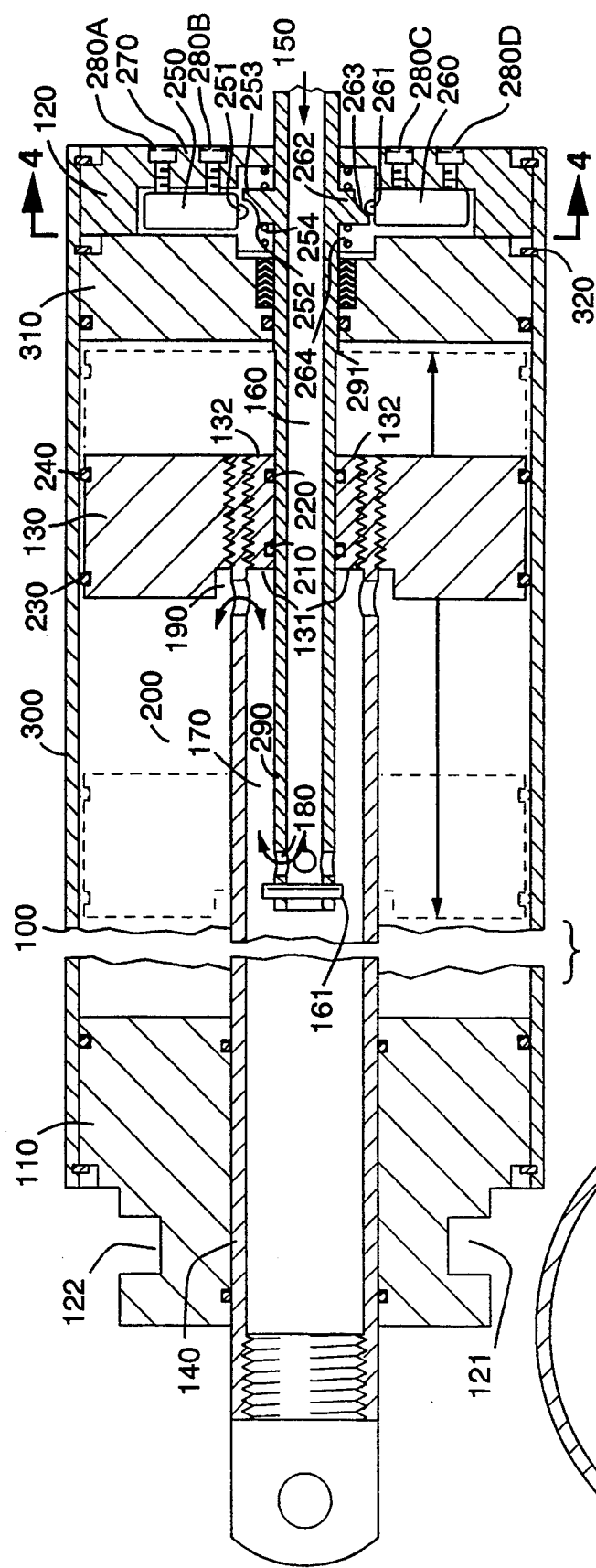
FIG. 3 is a foreshortened sectional view of a preferred embodiment of a cylinder.

FIG. 3 is a foreshortened sectional view of a preferred embodiment of a hydraulic cylinder (100) for the slidably attachable opening and closing means of the present invention. The cylinder (100) is closed on one end by a head (110) and on the fluid input end by a cap (120). A piston (130) is reciprocally mounted within the cylinder (100) and includes a threaded, hollow piston rod (140) which extends through the head (110) and extends from one end of the hydraulic cylinder. In this embodiment, the cylinder (100) has integral vertical side grooves (121, 122) in the portion of head (110) projecting beyond the end of the cylinder (100) for directly receiving slide plates. In this preferred embodiment there are no external, radial protrusions from the cylinder (100), and the slidable mounting of the hydraulic cylinder between the side plates (13) is accomplished with an opening between the plates less than the diameter of the hydraulic cylinder.

The cap (120) is provided to accommodate a fluid input line (150) which is secured to, usually integrally, and aligned with a fluid flow line (160) slidably passing through the piston (130), extending internal to the hollow piston rod (140) and projecting from the other end of said hydraulic cylinder. Conventional fittings and conduits, such as hose (not shown) are used for the input line (150) and for connecting the cylinder (100) with a source of pressurized fluid, as well as a reservoir for exhausted fluid.

Figure 4:
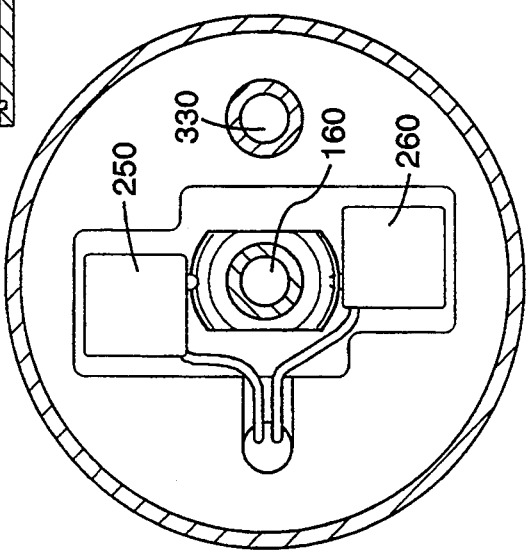
FIG. 4 is a sectional view taken along line 4-4 of FIG. 3.

Hydraulic fluid from the input line (150) passes into the fluid flow line (160, see arrow) out into the rod chamber (170) via a line aperture (180, see arrow) and leaves the piston rod (140) through a rod aperture (190, see arrow) to enter the hydraulic chamber (200) and move the piston (130, see arrows and dotted lines). Hydraulic fluid leaves the hydraulic chamber (200) via a fluid exhaust line (FIG. 4, element 330).

Sealing between the internal fluid flow line (160) and the piston (130) is achieved by annular sealing rings (210, 220). Similarly, sealing between the piston (130) and the cylinder sleeve (300) is achieved by o-rings (230, 240). It will be appreciated that these rings may be formed of any material which is accurately sized and which has long wearing characteristics.

Control over piston movement in this embodiment is provided by limit switches (250, 260). Limit switches are commercially available from MICRO SWITCH, a division of Honeywell (Newton, Mass.) and distributed by Relay Specialties Inc. (Oakland, N.J.). The limit switches (250, 260) are attached to the rear end face (270) of the cap (120) with mounting bolts (280A, 280B, 280C, 280D). Each switch (250, 260) has a convex protrusion (251, 261) which enables contact with a corresponding detection concavity (252, 262) which extends outwardly from the fluid flow line sleeve (290). The contact surface (253, 263) of each concavity (252, 262) can be made longer to adjust for movement override as needed. Normal movement is partially controlled by springs (254, 264) adjacent to each detection concavity (252, 262).

The fluid flow line sleeve (290) provides the radius for o-rings in the cylinder butt (310) to which the cap (120) is attached via a locking ring (320). Locking rings are commercially available from Smalley Steel Ring Co. (Wheeling, Ill.).

The fluid flow line sleeve (290) has a termination flanged end point (291) where the input line (150) joins the fluid flow line (160). The flow line sleeve (290) end point (291) is located toward the piston (130) from the face of the cylinder butt (310) for contact by piston (130) at one end of the stroke of the piston (130). The fluid flow line (160) also has an adjustment nut (161) for contacting the piston (130) at the other end of the stroke of the piston (130). When the piston (130) moves to the opposite ends of its stroke, the adjustment nut (161) and the sleeve end point (291) will make contact with piston contact points (131, 132 respectively) and the fluid flow line sleeve (290) will be pulled enough to cause the concavities (252, 262 respectively) to actuate the limit switches (250, 260). In other words, the fluid flow line (160) includes separate means for contacting the piston (130) at opposite ends of its stroke and fluid flow switching means responsive to contact between the contacting means and the piston (130) for changing hydraulic fluid flow.

To adjust the stroke of the piston (130), the cap (120) can be taken off, the adjustment nut (161) can be reached from the front, and the fluid flow line sleeve (290) can be replaced. This provides a readily operable means for increasing or reducing the piston stroke as permitted by the dies actually used.

FIGS. 5, 6, and 7 show another preferred embodiment of a cylinder (500) of the present invention. A piston (510) is reciprocally mounted within the cylinder (500) and includes a hollow piston rod (52Q). A fluid flow line (530) slidably passes through the piston (510), extending internal to the hollow piston rod (520).

Hydraulic fluid passes into the fluid flow line (530) out into the rod chamber (540) via a line aperture (550, see arrow) and leaves the piston rod (140) through a rod aperture (560, see arrow) to enter the hydraulic chamber (570) and move the piston (510). A fluid output line (580) slidably passes through the piston (510), terminating into the hydraulic chamber (570).

Piston movement in this embodiment is controlled by limit switches (600, 610). Each switch (600, 610) has a protrusion (601, 611) which enables contact with a corresponding compressible ring (602, 612) which surrounds the fluid flow line sleeve (590) and serves as a limit switch actuator. FIGS. 6 and 7 are sectional views showing corresponding movement of the rings (602, 612) to actuate each limit switch (600, 610). While it will be appreciated that these rings may be formed of any material which is compressible, the preferred material is urethane.

Although a preferred embodiment has been described with some particularity, many modifications and variations of the preferred embodiment are possible without deviating from the invention.

I claim:

1. A cylinder for removable attachment to a casting machine comprising a cylinder sleeve which houses a piston with a piston rod, said cylinder sleeve including a head member mounted in one end of said cylinder, said head member having integral vertical side grooves for mounting on said casting machines and further comprising a fluid flow line slidably passing through a center of said piston into said piston rod, wherein the fluid flow line is moveable within said cylinder when said piston reaches the opposite ends of its stroke, said fluid flow line further including separate means for contacting said piston at opposite ends of its stroke to move said fluid flow line.

2. The cylinder of claim 1 further comprising fluid flow switching means responsive to movement of said fluid flow line for engaging the fluid flow in said cylinder.

3. A hydraulic cylinder for removable attachment to a casting machine comprising:

a cylinder;

a piston slidably mounted in said cylinder;

a hollow piston rod connected to said piston and projecting from one end of said cylinder;

a fluid flow line projecting from the other end of said cylinder and slidably passing through said piston into said piston rod;

said fluid flow line moveable within said cylinder when said piston reaches the opposite ends of its stroke;

said fluid flow line including separate means for contacting said piston at opposite ends of its stroke to move said fluid flow line; and fluid flow switching means responsive to movement of said fluid flow line for changing the fluid flow in said cylinder.

4. The hydraulic cylinder of claim 3 including a head member mounted in one end of the cylinder and slidably passing the piston rod therethrough, said head member having integral vertical side grooves for mounting on said casting machines and the like.

* * * * *